(12) United States Patent
Wang et al.

(10) Patent No.: US 10,430,419 B2
(45) Date of Patent: *Oct. 1, 2019

(54) SUGGESTING CONNECTIONS TO A USER BASED ON AN EXPECTED VALUE OF THE SUGGESTION TO THE SOCIAL NETWORKING SYSTEM

(71) Applicant: Facebook, Inc., Menlo Park, CA (US)

(72) Inventors: James H. Wang, San Francisco, CA (US); Jennifer Burge, San Francisco, CA (US); Lars Seren Backstrom, Mountain View, CA (US); Florin Ratiu, Mountain View, CA (US); Daniel Ferrante, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 1304 days.

This patent is subject to a terminal disclaimer.

(21) Appl. No.: 13/947,355

(22) Filed: Jul. 22, 2013

(65) Prior Publication Data

US 2013/0311568 A1    Nov. 21, 2013

Related U.S. Application Data

(63) Continuation of application No. 12/857,533, filed on Aug. 16, 2010, now Pat. No. 8,521,661.

(51) Int. Cl.
*G06F 16/2457* (2019.01)
*G06F 16/332* (2019.01)
(Continued)

(52) U.S. Cl.
CPC ...... *G06F 16/24578* (2019.01); *G06F 15/163* (2013.01); *G06F 16/3322* (2019.01); *G06N 5/02* (2013.01); *G06Q 30/02* (2013.01)

(58) Field of Classification Search
CPC ............. G06F 17/3053; G06F 17/3064; G06F 15/163; G06Q 30/02; G06N 5/02
See application file for complete search history.

(56) References Cited

U.S. PATENT DOCUMENTS

| | | | |
|---|---|---|---|
| 2005/0216300 A1* | 9/2005 | Appelman ............. | G06Q 10/10 705/319 |
| 2008/0040428 A1* | 2/2008 | Wei ........................ | G06Q 50/10 709/204 |

(Continued)

OTHER PUBLICATIONS

Song, Cho, Dave, Zhang, Qiu, "Scalable Proximity Estimation and Link Prediction in Online Social Networks", ACM, Proceedings of the 9th ACM SIGCOMM conference on Internet Measurement Conference, 2009, pp. 322-335.*

(Continued)

*Primary Examiner* — Ben M Rifkin
(74) *Attorney, Agent, or Firm* — Fenwick & West LLP

(57) ABSTRACT

To suggest new connections to a user of a social networking system, the system generates a set of candidate users to whom the user has not already formed a connection. The system determines the likelihood that the user will connect to each candidate user if suggested to do so, and it also computes the value to the social networking system if the user does connect to the candidate user. Then, the system computes an expected value score for each candidate user based on the corresponding likelihood and the value. The candidate users are ranked and the suggestions are provided to the user based on the candidate users' expected value scores. The social networking system can suggest other actions to a user in addition to forming a new connection with other users.

17 Claims, 3 Drawing Sheets

(51) Int. Cl.
  *G06N 5/02* (2006.01)
  *G06Q 30/02* (2012.01)
  *G06F 15/163* (2006.01)

(56) References Cited

U.S. PATENT DOCUMENTS

| | | | | |
|---|---|---|---|---|
| 2008/0077574 | A1* | 3/2008 | Gross | G06F 17/30699 |
| 2008/0294589 | A1* | 11/2008 | Chu | G06F 21/6245 |
| | | | | 706/55 |
| 2009/0271370 | A1* | 10/2009 | Jagadish | G06Q 10/10 |
| 2009/0271379 | A1 | 10/2009 | Bakalash et al. | |
| 2009/0319288 | A1* | 12/2009 | Slaney | G06Q 10/10 |
| | | | | 705/1.1 |
| 2010/0250336 | A1* | 9/2010 | Selinger | G06Q 30/02 |
| | | | | 705/26.7 |
| 2011/0191371 | A1* | 8/2011 | Elliott | G06Q 10/107 |
| | | | | 707/770 |

OTHER PUBLICATIONS

Charikar, Chen, Farach-Colton, "Finding Frequent Items in Data Streams", ACM, Springer-Verlag, Proceedings of teh 29th International Colloquium on Automata, Languages and Programming, 2002, pp. 693-703.*

Koren, "Collaborative Filtering with Temporal Dynamics", ACM Proceedings of the 15th ACM SIGKDD International Conference on Knowledge Discovery and Data Mining, 2009, pp. 447-456.*

Charikar et al., "Finding Frequent Items in Data Streams," ACM, Springer-Verlag, Proceedings of the 29$^{th}$ International Colloquium on Automata, Languages and Programming, 2002, pp. 693-703.

Koren, "Collaborative Filtering with temporal Dynamics," ACM Proceedings of the 15$^{th}$ ACM SIGKDD International Conference on Knowledge Discovery and Data Mining, 2009, p. 447-456.

Lu et al., Supervised Link Prediction Using Multiple Sources, IEEE 10$^{th}$ International Conference on Data Mining (ICDM), Dec. 13-17, 2010, pp. 923-928.

Song et al., "Scalable Proximity Estimation and Link Prediction in Online Social Networks," ACM, Proceedings of the 9$^{th}$ ACM SIGCOMM Conference on Internet Measurement, 2009, pp. 322-335.

Chin, A., "Finding Cohesive Subgroups and Relevant Members in the Nokia Friend View Mobile Social Network", 2009 International Conference on Computational Science and Engineering, 2009, pp. 278-283.

U.S. Office Action, U.S. Appl. No. 14/296,429, dated Sep. 28, 2016, 27 pages.

U.S. Office Action, U.S. Appl. No. 14/296,429, dated Jul. 27, 2017, 23 pages.

* cited by examiner

SUGGESTING CONNECTIONS TO A USER BASED ON AN EXPECTED VALUE OF THE SUGGESTION TO THE SOCIAL NETWORKING SYSTEM

CROSS REFERENCE TO RELATED APPLICATIONS

This application is a continuation of U.S. patent application Ser. No. 12/857,533, filed Aug. 16, 2010, entitled "Suggesting Connections to a User Based on an Expected Value of the Suggestion to the Social Networking System," the contents of which are incorporated by reference in their entirety.

BACKGROUND

This invention relates generally to social networking systems, and more particularly to suggesting connections and/or interactions to users or objects within a social networking system.

Users of social networking services may form connections, associations, or other relationships with other users based on real-life interactions, online interactions, or a mixture of both. For example, users may choose to connect with others who may be from the same geographic location, travel in the same circle of friends, or may have attended the same college or university. Once connected within the social networking system, users may preferentially interact with their connections by messaging each other, posting content about each other, playing interactive games with each other etc. Social networking systems value user connections because better connected users tend to use the social networking system more, thus increasing user engagement and providing a better user experience. Accordingly, it is generally desirable that users have many connections within the social networking system.

Although it is beneficial to have users with many connections within the social networking system, it may be difficult for users of a social networking system to locate other users with whom they may wish to form a connection. Social networking systems generally provide a way for users to find such connections. However, many of these methods are time and labor intensive. For example, a user may be required to enter the name, email address, instant messaging ID, and other similar data to locate another user within the social networking system. Since such a method of locating connections is time and labor intensive, a user may choose not to form certain connections within the social networking system. Additionally, users may simply forget to locate some connections within the social networking system.

Social networking systems do provide mechanisms for suggesting other users that a particular user may know. In such a system, one or more other users may be suggested as possible connections to a particular user if those other users are in the same social network or otherwise appear likely to be known to the user. For example, if a user is part of a university network, other users, also a part of the university network but not connected with the first user, may be suggested as potential connections for the user. Such a method of suggesting friends may reduce the time and labor associated with locating users within the social networking system, but it may also provide irrelevant suggestions. For example, just because two users are part of a same university network, those users do not necessarily know each other in real life.

Another method of suggesting connections within a social networking system is to determine the number of common connections between two users. For example, if two users have a large number of common connections, the users may be suggested to each other as potential connections. However, such a system may not be any more precise than the other method of suggesting connections because it is not necessary that two users with a same mutual connection know or interact with each other outside the social networking system. Additionally, such a system is biased against suggesting friends to a new user of a social networking system or a user who many not have many connections within the social networking system. For example, if a user only has two connections within the social networking system, the user will at most have two connections in common with a user who has two hundred connections within the social networking system.

Although it is valuable to facilitate connections for users with few connections within the social networking system, a system that suggests connections based on the number of mutual friends will likely make suggestions to those users with many connections within the social networking system when compared to users with few connections within the social networking system. This leads to a sub-optimal result for the social networking system, since an additional friend for a user with many friends is less valuable than an additional friend for a user with relatively few friends. Other suggestion systems similarly focus on simply adding connections among users without regard to the result of the suggested connections. Accordingly, existing mechanisms that suggest new connections to a user based merely on indicators of a likely connection fail to address the value of the resulting connections to the social networking system.

SUMMARY

To enhance the experience of the users of a social networking system while increasing value to the social networking system, embodiments of the invention suggest that a user takes an action within the social networking system, where the suggestion is based on the likelihood that the user will perform the suggested action as well as the value to the social networking system if the user does so. In one embodiment, the suggested action may include any interaction within the social networking system, such as joining a group, becoming a fan of a non-user entity, liking an object or an advertisement, confirming attendance at an event, sending a message to another user, tagging a user in an image, or any other type of interaction a user may perform within the social networking system. In another embodiment, the suggested action is for the user to form a new connection or request a new connection with another user of the social networking system. In other embodiments, the suggested action may include a user forming a connection with or requesting a new connection with an object, event, advertisement, entity or concept within the social networking system. The suggestions may be provided to a user in a certain portion of an interface, such as a portion of a web page that contains other content. Alternatively, the suggestions may be provided responsive to an action by the user, such as the submission of a search query, accepting or sending a connection request, liking or commenting on an item, posting or answering a question on a social network.

In an embodiment of the invention wherein the social networking system suggests a user to form a connection or request a connection with other users of the social networking system, a list of candidate users not associated with the user is generated. In one embodiment, a first list of users is generated comprising users who are friends with the user, have requested a friendship with the user, have been suggested as friends by other users of the social networking system and users imported from the user's contact book outside the social networking system is generated. A candidate list of users is generated by retrieving the friends of users in the first list who are not friends with the user.

For each candidate user, the social networking system computes the probability score that the user will form a friendship with each candidate user within the social networking system. In one embodiment, the social networking system uses machine learning algorithm and computes a probability of connection based on historical data.

The social networking system also computes a social network value score for each candidate, where the value score is indicative of the value to the social networking system if the candidate user forms a connection with the user. Although the social networking system may define any number of functions or algorithms for computing the value score, in one embodiment the score is based on a function that weighs new connections for less active users more highly than new connections for active users of the social networking system, thereby targeting less active users for increased engagement with the social networking system.

The probability score and the value scores are used to determine an expected value to the social networking system for suggesting each candidate user as a suggested connection to the user. The social networking system then determines one or more suggestions to provide to the particular user based on these expected values.

In one embodiment, once a candidate user is suggested to the user, the candidate user's expected value score is discounted, thereby lowering the expected value score and user ranking New suggestions are provided to the user based on the discounted expected value score to suggest new candidate users to the user. In one embodiment, the process is iteratively repeated.

Although discussed above in terms of suggesting that a user form a new connection with another user, other embodiments of the invention may provide any object, entity, advertisement or concept associated with the social networking system can be suggested as new connections to the user. Additionally, in other embodiments of the invention, the social networking system can provide different suggestions to the user. As explained above, any type of activity within the social networking system can be suggested to a particular user, where the suggested activity is selected based on the likelihood that the user will follow the suggestion as well as the value to the social networking system if the user does follow the suggestion. In this way, the suggestion system can maximize or increase the expected value to the social networking system, rather than merely maximize the likelihood of a successful suggestion. Additionally, while embodiments of the invention discuss the suggestions in terms of a passive suggestion that a user receives in a user interface, embodiments of the invention include providing the user with a response to a user-initiated action, such as a search query.

The disclosed embodiments of the invention provide users to easily make connections with other users they may know. Such connections allow users to more effectively interact with other users. The interactions may provide a user with a more meaningful user experience within the social networking system. Consequently, the social networking system may have a more engaged user base and may lead to higher use of the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Configuration Overview

A social networking system offers its users the ability to communicate and interact with other users of the social networking system. As used herein, a "user" can be an individual or an entity (such as a business or third party application). The term "connection" refers individuals and entities with which a user of the social networking service may form a connection, association, or other relationship. In use, users join the social networking system and then connect with other users, individuals, and entities with whom they desire to be connected. Additionally, social networking systems provide various communications channels for users to interact with each other within the system. Thus, users of a social networking system may interact with each other by "posting" content items of various types of media through the communication channels. As users increase their interactions with each other within the social networking system, they engage with the social networking system on a more frequent basis. One method to increase user engagement with the social networking system is to facilitate an increase in user connections within a social networking system such that additional connections are valuable to the social networking system.

Figure 1:
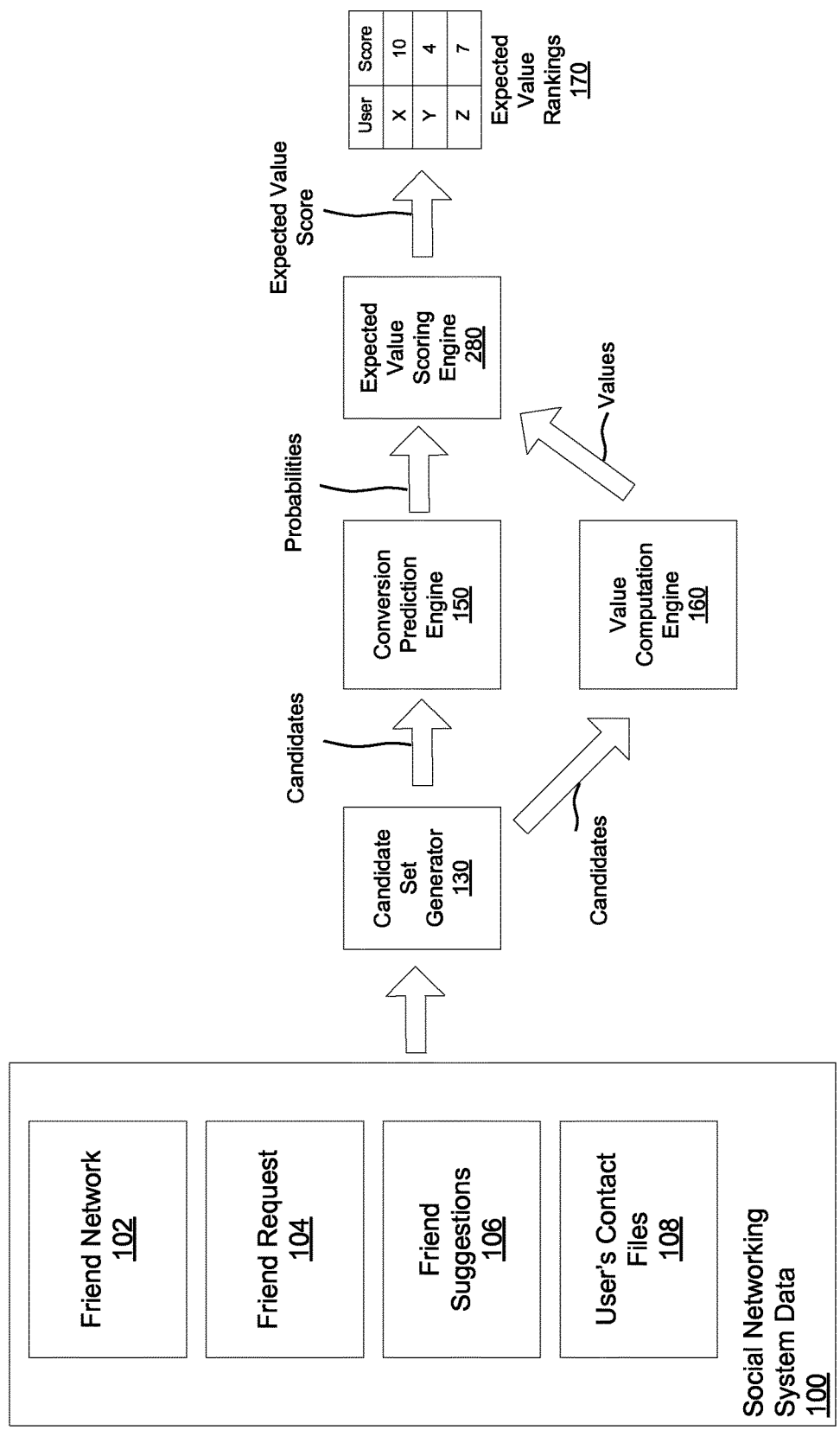
FIG. 1 is a diagram of a system for ranking users based on a prediction of whether two users will connect within the social networking system and the value of the connection to the social networking system, in accordance with an embodiment of the invention.

FIG. 1 illustrates a system for ranking users of a social network based on the probability of whether two users will form a connection with each other within the social networking system and the value of the connection to the social networking system. The system comprises a user's social networking data 100, a candidate set generator 130, a conversion prediction engine 150, a value computation engine 160, an expected value scoring engine 280 and a database of expected value rankings 170 assigned to each candidate user. On a high level, a candidate set of user not associated with the user is generated by the candidate set generator 130 by accessing data within the social networking system data 100. The conversion prediction engine 150 receives the list of candidates and determines the value to the social networking system for each connection between the user and each candidate user. Similarly, the value computation engine 160 receives a list of candidates and determines the value to the social networking system for each candidate user if the candidate user forms a connection with the user. The expected value computation engine receives probabilities from the conversion prediction engine 150 and values from the value computation engine 160 to compute an expected value score for each candidate user. Each candidate user is subsequently ranked in a database 170 based on each candidate's expected value score. In one embodiment, the highest ranked candidates can be displayed to the user as suggested connection the user may know, either within or outside the social network. In other embodiments, other items can be ranked using the system described above.

In one embodiment, a user's social networking system data 100 comprises the user's friend network 102, friend request data 104, friend suggestion data 106, and the user's contact file 108. A friend network 102 comprises the names and associated information of all the users who have formed a connection with the user. For example, if a user has accepted the first user's friend request, the two users have formed a connection or a friendship within the social networking system. Each user's name would appear on the other's friend network. The friend request data 104 comprises the names and associated information of user who have requested that the user add the users to the first user's friend network 102. The friend suggestion data 106 comprises name and associated information of users who are suggested as friends either by other friends of the user, mutual friends of the users or by the social networking system. The user's contact files include the name and associated information of all the user within the social networking system that the user has communicated with, either through email, instant messaging, text messaging, wall posts within the social network. These are just a few examples of the interactions which a user can engage in within the social networking system, and many others are possible, and described in greater detail below. Thus, according to one embodiment, the social networking system data 100 comprises all the users of the social networking system the user has communicated with or been in contact with on some level within the social networking system.

The candidate set generator 130 generates a list of candidate users by accessing the data stored within the social networking system data 100. In one embodiment, the candidate set generator 130 generates a list of other users within the social networking system who have not yet formed a connection with the user but who may be associated in some way to the user. Various embodiments for determining candidate users are described in greater detail in reference to FIG. 3

The conversion prediction engine 150 receives the list of candidate users generated by the candidate set generator 130 and determines the probability associated with each candidate user forming a connection with the user within the social networking system. In one embodiment, the conversion prediction engine 150 uses historic demographic and behavioral data associated with all user connections within the social networking system to determine a probability of a connection. Other embodiments for determining a probability score are described in greater detail below in reference to FIG. 3.

The value computation engine 160 receives a list of candidates from the candidate set generator 130 to determine the value of connection between the user and the candidate users to the social networking system. The value computation engine 160 uses historic demographic, behavioral and usage data to determine a social system value score for each candidate user.

The expected value scoring engine 280 uses the probability score received from the conversion prediction engine 150 and the social system value score from the value computation engine to determine an expected value score for each candidate user. The expected value scoring engine outputs a list of candidate users ranked by their expected value score 170.

The expected value rankings 170 can be used by the social networking system to provide numerous suggestions to the user. Embodiments of the suggestions are described in greater detail below in reference to FIG. 3. As described above, the candidate set generator 130, the conversion prediction engine 150, the value computation engine 160 and the expected value scoring engine 280 are described in greater detail below in reference to FIGS. 2 and 3.

System Architecture

Figure 2:
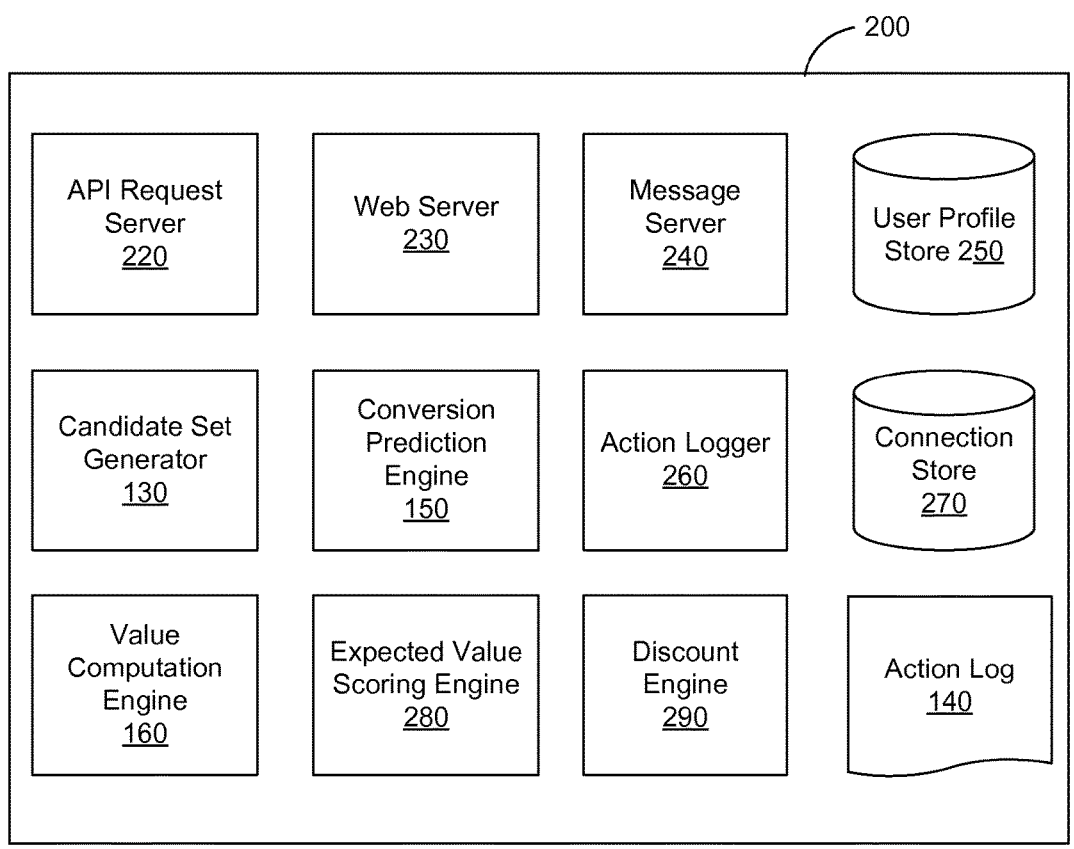
FIG. 2 is a high level block diagram of a system, in accordance with an embodiment of the invention.

FIG. 2 is a high level block diagram illustrating a system for scoring users based on a probability of connection with a first user and the value of connection to the social networking system, in accordance with an embodiment of the invention. The social networking system 200 includes an application programming interface (API) request server 220, a web server 230, a message server 240, a user profile store 250, an action logger 260, an action log 140, a connection store 270, a candidate set generator 130, a conversion prediction engine 150, a value computation engine 160, an expected value scoring engine 280 and a discount engine 290. In other embodiments, the social networking system 200 may include additional, fewer, or different modules for various applications. Conventional components such as network interfaces, security mechanisms, load balancers, failover servers, management and network operations consoles, and the like are not shown so as to not obscure the details of the system.

In some embodiments, the system 200 is not a social networking system but communicates with a social networking system to obtain the necessary social network information. The system 200 may communicate with the social networking system, for example, using APIs provided by the social networking system. In these embodiments, some modules shown in FIG. 2 may run in the system 200, whereas other modules may run in the remote social networking system. For example, the modules including the a conversion prediction engine 150 and value computation engine 160, expected value scoring engine 280 and others may run in the system 200 but modules API request server 220, user profile store 250, connection store 270, and action log 140 may exist in a separate social networking system.

The social networking system 200 allows users to communicate or otherwise interact with each other and access content, as described herein. The social networking system 200 stores user profiles in the user profile store 250. The user profile information stored in user profile store 250 describes the users of the social networking system 200, including biographic, demographic, and other types of descriptive information, such as work experience, educational history, gender, sexual preferences, hobbies or preferences, location, and the like. The user profile may also store information provided by the user, for example, images. In certain embodiments, images of users may be tagged with the identification information of the appropriate users whose images are displayed.

The social networking system 200 further stores data describing one or more connections between different users in the connection store 270. The connections are defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship, for example, family, or friend, or colleague. Users may select from predefined types of connections, or define their own connection types as needed.

The web server 230 links the social networking system 200 via a network to one or more client devices; the web server 230 serves web pages, as well as other web-related content, such as Java, Flash, XML, and so forth. The web server 230 may communicate with the message server 240 that provides the functionality of receiving and routing messages between the social networking system 200 and client devices. The messages processed by the message server 240 can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system besides the recipient of the message is a wall post. In some embodiments, a user can send a message can send a private message to another user that can only be retrieved by the other user.

The action logger 260 is capable of receiving communications from the web server 230 about user actions on and/or off the social networking system 200. The action logger 260 populates the action log 140 with information about user actions to track them. Any action that a particular user takes with respect to another user is associated with each user's profile, through information maintained in a database or other data repository, such as the action log 140. Such actions may include, for example, adding a connection to the other user, sending a message to the other user, reading a message from the other user, viewing content associated with the other user, attending an event posted by another user, being tagged in photos with another user, liking an entity, among others. In addition, a number of actions described below in connection with other objects are directed at particular users, so these actions are associated with those users as well. When a user takes an action on the social networking system 200, the action is recorded in an action log 140. In one embodiment, the social networking system 200 maintains the action log 140 as a database of entries. When an action is taken on the social networking system 200, the social networking system 200 adds an entry for that action to the log 140.

The API request server 220 allows external systems to access information from the social networking system 200 by calling APIs. The information provided by the social network may include user profile information or the connection information of users as determined by their individual privacy settings. For example, a system interested in predicting the probability of users forming a connection within a social networking system may send an API request to the social networking system 200 via a network. The API request is received at the social networking system 200 by the API request server 220. The API request server 220 processes the request by determining the appropriate response, which is then communicated back to the requesting system via a network.

Continuing with FIG. 2 the candidate set generator 130 populates a set of users who may interact with a first user outside the social networking system but not connected to the first user within the social networking system. In one embodiment, the candidate set generator 130 populates a first list comprising of the user's friends, users who sent a friend request to the user, users suggested as friends by other users of the social networking system and users imported from the user's email contacts, if available. Additionally, the candidate set generator 130 populates a set of users who are connected to the users in the first list. The candidate set generator 130 removes the names of all users from the list who are already connected to the user. Thus, the candidate list generator creates a candidate list of friends of the user's friends who not connected to the user within the social networking system. In other embodiments, the candidate set generator 130 can generate a list of candidate users comprising friends of the user's friends who also share certain similar characteristics with the user. A list of similar characteristics includes, but is not limited to: sharing a social network, similar college or high school graduation year, checking into the social network from the same location at about the same time, etc. In another embodiment, the candidate list generator 130 generates a candidate list of user by selecting a portion of the friends of the user's friends not connected to the user by using a heuristics to narrow the field or linear-time rank algorithm to find a cutoff point to exclude the friends of the user's friends.

The conversion prediction engine 150 predicts whether a user will act on the friend suggestion. In one embodiment, the conversion prediction engine 150 is a machine learning model trained using a set of historical data. Historical data includes, but is not limited to demographic data, behavioral data and communications data of a user within the social networking system. For example, the conversion prediction engine 150 can use data associated with the user and each candidate user, such as the number of friends in common, the length of time two users have been friends, ratio of mutual friends to total friends, age, gender, country, total friends, time spent on the social networking system, the length of time the users have been associated with the social networking system etc to predict the likelihood of a connection between the user. In one embodiment, a training set is generated using historical data of users to whom previous suggestions were made, data about the users who were the subject of the suggestion and whether the user acted on the suggestion. In one embodiment the conversion prediction engine 150 is trained using the training set data. Subsequently, the user and candidate user data is input to the conversion prediction engine 150. The conversion prediction engine 150 outputs the probability that the user will act on the friend or connection suggestion for each candidate user. For example, the conversion prediction engine 150 may find a discount factor associated with users who have been friends for a long period of time within the social networking system based on data that new connections of a recently added friend may be more likely to be a mutual friend of the user.

The value computation engine 160 determines a value of a connection to the social networking system. In one embodiment the value computation engine 160 is an assignment system for assigning a pre-determined arbitrary value to a particular type of connection within the social networking system. For example, having only one association within the social networking module may have a high score associated with it. The value computation engine 160 assigns the high score to the candidate user with only one association within the social networking system.

The expected value scoring engine 280 is a computation algorithm used to combine the probability score with the value computation score. In one embodiment, the value scoring engine 280 multiples the probability score determined by the conversion prediction engine 150 with the value score determined by the value computation engine

160. In other embodiments, the expected value scoring engine 280 takes the sum of multiple values of the probability score and the value score and their probability of occurring to generate an expected value score.

The social networking system suggests candidate users to the user based on each candidate user's expected value score. For example, the social networking system can suggest candidate users with the highest expected value score. In such an embodiment, the discount engine 290 discounts the expected value score for each candidate user suggested to the user. In one embodiment, the discount engine 290 provides a discount value associated with each impression of a suggestion shown to the user. In another embodiment, the discount engine 290 re-ranks each user based on the number of user impressions shown to the user. Thus the discount engine enables the social networking system to make new suggestions with new candidate users to the user.

Although discussed above in terms of suggesting that a user form a new connection with another user, other embodiments of the invention may provide different suggestions to the user. As explained above, any candidate connection can be suggested as a new connection to a particular user. A candidate connection within the social networking system can include any entity, object, advertisement, concept or user within the social networking system. In one embodiment, the social networking system suggests a connection to a user based on the likelihood that the user will establish or request a connection with the candidate connection and the value of the connection between the user and the candidate connection to the social networking system. In one embodiment, the social networking system suggests an entity such as PINKBERRY or a concept such as 'running' to a user based on the probability of whether the users will form a connection with PINKBERRY or running, within the social networking system and the value of the connection between PINKBERRY or running and the user. In one embodiment, the probability of a connection between the user and the object is determined by the conversion prediction engine 150 based on historic demographic, behavioral and usage data associated with the user within the social networking system. Similarly, a value of the connection to the social networking system is determined by the value computation engine 160 based on historic demographic and behavioral data associated with the user and the specifications provided by or the characteristic associated with the object. For example, if an advertisement object includes targeting criteria, the value of a connection between the advertisement and the user is greater if the user matches the provided advertising criteria. Similar to the embodiments presented above for a connection with the user, each candidate object receives an expected value score based on a combination of the probability score and the social network value score calculated by the expected value scoring engine 280. Each object is ranked in a database 170 based on the expected value score associated with the object. In one embodiment, the highest ranked object is displayed to the user as a suggested connection the user may be associated with, either within or outside the social networking system.

In other embodiments, the social networking system suggests actions a user can perform within the social networking system. Suggested actions within the social networking system can include joining a group, becoming a fan of a non-user entity, confirming attendance at an event, sending a message to another user, tagging a user in an image, or any other type of interaction with an object that the user may perform within the social networking system. In one embodiment, the candidate set generator 130 generates candidate suggestions responsive to a received action suggestion. In one embodiment, action suggestions are received by the candidate set generator 130. Responsive to the action suggestions, the candidate set generator 130 generates candidate suggestions. For example, if the candidate suggestion is performing an action within the social networking system, such as messaging, poking, tagging, the candidate set generator 130 generates a candidate list of users with whom the user can perform the suggested actions within the social networking system. In such an embodiment, the candidate set generator 130 retrieves messaging, poking or tagging data for the user and suggests other users who have not been messaged, poked or tagged by the user. If on the other hand candidate suggestion is playing video games, for example, the candidate set generator 130 generates a list of candidate games the user can play within the social networking system. In such an embodiment, the candidate set generator 130 retrieves user data regarding video game usage within the social networking system. Based on the type of game played, duration and frequency of play, interactivity, challenge and other factors, the candidate set generator 130 generates a set of games never played by to user but with high affinity to the factors considered, such as type of game, duration and frequency of play etc.

Similar to the embodiments described above with regards to suggesting candidate users, the conversion prediction engine 150 uses machine learning to determine, for example the probability that the user will perform other actions within the social networking system such as send a message to a candidate user or play a particular video game based on historical data. Additionally, the expected value scoring engine 280 assigns a social network value score to a particular action based on the value of the action to the social networking system. For example, if the social networking system highly values playing a particular video game within the social networking system, the expected value scoring engine 280 provides a high score to the particular video game. The expected value score is provided by the social networking system and can be updated to reflect changes in value of performing a particular action within the social networking system. The value computation engine 160 combines the prediction score and the social network value score to determine an expected value score similarly to the embodiments described above. Once an expected value score is determined for each candidate action, each candidate action can be ranked, wherein the highest rank is associated with the highest expected value. The social networking system suggests actions to the user based on the ranking Once an action is suggested to the user the expected value discount engine 290 discounts the expected value score for each action suggested to the user similarly to the embodiments described above. In such an embodiment, the social networking system can iteratively discount expected value and suggest action to the user.

Method of Ranking Candidate Users according to an Expected Value Score

Figure 3:
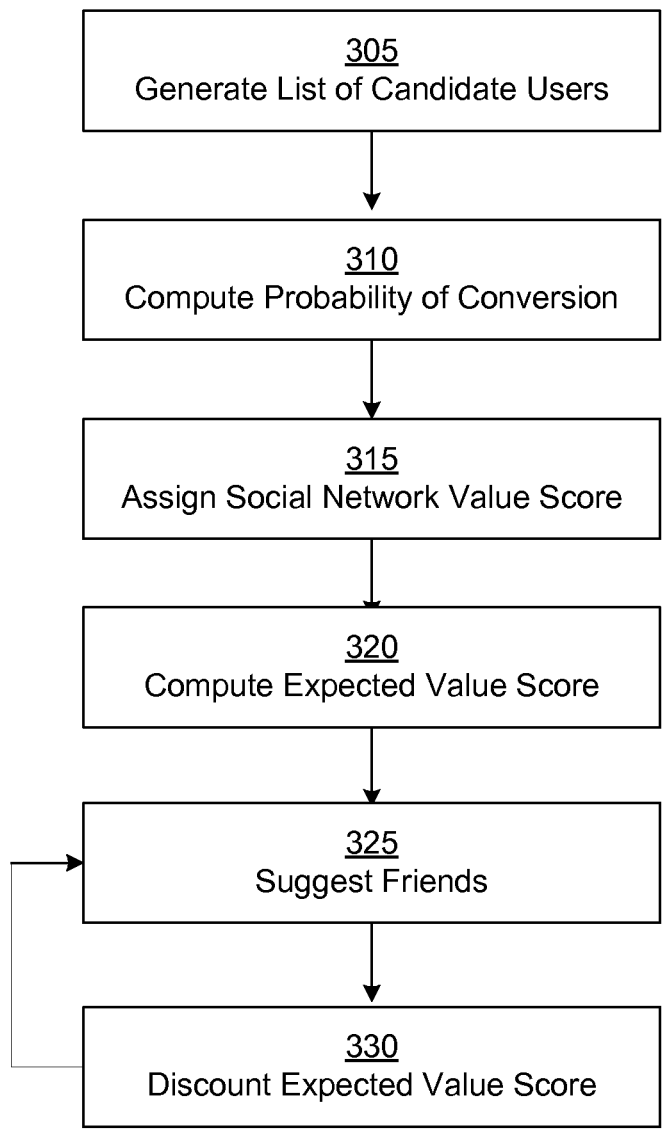
FIG. 3 is a flow chart of a process for computing an expected value score for users of a social networking system, in accordance with an embodiment of the invention.

FIG. 3 illustrates an embodiment of a process 300 for suggesting friends to a user within the social networking system. In one embodiment, a user is one for whom the social networking system needs suggestion. For example, if a user navigates to a page within the social networking system providing friend suggestions, the process 300 is executed in order to provide friends suggestions for the user.

The process 300 generates 305 a list of candidate users not connected with the user. In one embodiment, the process 300 generates a first list of user associated with the user. For example, process 300 accesses social networking system data 100 to retrieve friend network data 102, friend request data 104, friend suggestions data 106 and user's contact file data 108. In such an embodiment, the process generates the first list of associations comprising the user's friends from the friend network data 102, users who have requested a friendship with the user from the friend request data 104, users who have been suggested as friends to the users by other users of the social networking system from friend suggestions data 106 and users imported from the user's contact book, such as OUTLOOK contacts from the user's contact files 108. Once the first list of associations is generated, the process 300 uses the first list to generate 305 a list of users not associated with the user. In one embodiment, the process 300 generates 305 a list of candidate users by retrieving all users associated with the users on the first list. Additionally, the process generates 305 a list of candidate users by removing from the candidate list, all users who are connected with the first users, such as the users on the first list. In other embodiments, the process 300 generates 305 a list of candidate users based on data within the social networking system. For example, the process 300 can search demographic data similar to the user. If another user matches the user's demographic data, including but not limited to, name of the high school or college, graduation year, workplace name etc. Additionally, the process can also include users who check into the social networking system from about the same location as the user at about the same time. Finally, the process 300 removes all users who are already associated with the user within the social networking system. Thus, the process generates 305 a list of candidate users not associated to the user within the social networking system.

The process 300 computes 310 the probability of the user becoming friends with each candidate user. In one embodiment, the process executes a prediction algorithm. A prediction algorithm can be a machine learning model trained using historical data. For example, the process 300 receives historical data such as demographic data, behavioral data or communications data for a user. Historical data includes, but is not limited to data about a user's age, number of friends, work status, school status, activity level including the amount of interaction with other users within the social networking system, the number of logins per day, the number of refreshes per day, the amount of photos or videos uploaded, etc. The process receives historical data for users and provides the data as signals to the conversion prediction engine 150 to train a probabilistic model.

In one embodiment, the process identifies two or more users with historical data that includes information about the user to whom previous suggestions were made, information about the users who were the subject of the suggestion and whether the user acted on the suggestion. In one embodiment, information on users includes: the number of friends in common, whether the users are part of the same primary network, the number of networks in common, political affiliations, the difference in age, the gender of the users, home geographic ID, home country, current country, work history including, work company overlap, work company time overlap; school history including school overlap, school type overlap, etc.

Additionally, the process 300 provides historical data for the user and each candidate user to the conversion prediction engine as signals. In such an embodiment, the process 300 computes 310 the probability of the user and each candidate user becoming friends by executing the conversion prediction engine 150 algorithm. Thus, each candidate user is rated with a conversion probability score.

In another embodiment, the process 300 computes the probability of conversion 310 using a predetermined probability score which is based on some understanding of user relationships within the social networking system. For example, the candidate users can be predicted to be friends with the user if the candidate users have a certain number of friends in common with the user.

A social network value score is assigned 330 by the process 300. A social network value score is a measure of value of a connection to the social networking system. In one embodiment the social network value score is based on engagement level within the social networking system. For example, the process assigns 315 a higher social network value score to a candidate user if the user's frequency of social networking system usage is low. In other embodiments, the process assigns 315 a higher social network value score to candidate users with few friends within the social networking system, or part of a particular demographic such as age range or gender, etc. The social network value score allow the social networking system to preferentially engage certain users of the social networking system. By suggesting friends with low activity level within the social networking system, the system can enable those users to likely have more friends as a result being suggested more than users with lower social network value score and thereby likely increasing the candidate user's engagement level with the social networking system.

The process computes 320 an expected value score once the probability of a conversion is computed 310 and the network value score is assigned 315. An expected value score is a combination of the probability score and the network value score. In one embodiment the two score are combined by multiplying the scores. In another embodiment, the combined score or the expected value score is computed 320 by weighing one of the conversion or value scores more heavily based on the social networking system's targeting criteria or preferences. The expected value score is used to rank each candidate user wherein a best ranking is assigned to the user with the best conversion prediction score and the best value score or the best combined score. In one embodiment, the process 300 ranks candidate users according to their computed expected score such that candidate users with the highest expected value score are ranked the highest.

The process suggests 330 candidate users with the highest expected value score to the user. In one embodiment, candidate users are suggested 325 by displaying the candidate user profile to the user. In another embodiment, a candidate user is suggested 325 by sending a message to the user indicating a friend suggestion. In other embodiments, other methods of notifying the user of a friend suggestion can be used. In one embodiment, candidate users below a certain threshold score are not suggested 325 to the user. In another embodiment, candidate users below a certain ranking are not suggested 325 to the user.

Once a candidate user is suggested to the user one or more times, the process discounts the candidate user's ranking. In one embodiment, each time a candidate user is shown to the user, the process discounts 330 the candidate user's expected value score, thereby lowering the candidate's ranking. In one embodiment, the process discounts 330 candidate users based on the frequency with which a candidate users is suggested to the user. In another embodiment, the process applies a discount based on the how the candidate user was suggested to the user. For example, an email suggestion may carry a higher discount score than displaying a candidate user on a portion on a web page within the social networking system. Since the process discounts 330 expected value scores of candidate users already suggested to the user, it tends to bump suggested candidate users down the list of ranked candidates, allowing the social networking system to make new suggestions with new candidate users. The process of discounting 330 expected value score and making new suggestions 325 is iteratively repeated. It should be noted that in some embodiments, candidate users below a certain threshold expected value score are not suggested 325 by the process 300.

Although discussed above in terms of suggesting that a user form a new connection with another user, other embodiments of the invention may provide different suggestions to the user. As explained above, any type of activity within the social networking system can be suggested to a particular user, where the suggested activity is selected based on the likelihood that the user will follow the suggestion as well as the value to the social networking system if the user does follow the suggestion.

In such an embodiment, the process generates a list of candidate actions a user can perform within the social networking system responsive to one or more actions specified by the social networking system. For example, the social networking system can provide a candidate action, such as sending a message to another user, or tagging another user in a picture, or poking another user. In such an embodiment, the process generates a candidate list of users whom the user can send a message to, or poke or tag in an picture uploaded to the social networking system. On the other hand, the social networking system can provide, for example, playing video game as a candidate action. In such an embodiment, the process 300 generates a list of candidate video games that the user has not played. For example, the process can generate a list of factors associated with video games a user currently plays within the social networking system, such as, the type of game, the frequency and duration of play, the level of interactivity required etc. Based on the factors, the process generates 300 a candidate set of games the user has not played to suggest to the user.

Similar to the embodiments described above in reference to suggesting candidate users, the process computes 300 a probability of a user a user sending a message to each candidate user or playing each candidate video game, for example. Additionally, the process assigns 300 a social network value score to each candidate user or video game based on the value score provided by the social networking system. The social network value score dependant on whether the social networking system wants to encourage a particular action, such as send a message to a particular candidate user or playing a particular video game. Wherein, a higher value score is associated with an action the social networking system wants to encourage. Similar to the embodiments described above, the process 300 computes an expected value score from the probability score and the value score. Furthermore, the process suggests actions to the user based on the expected value score, wherein the candidate actions receiving the highest expected value score are displayed first to the user. Additionally, the process 300 also discounts the expected value score for each action suggested to the user. The process 300 for suggesting actions within the social networking system is iteratively repeated such that once an action is suggested to the user, the action's expected value is discounted, generating a new expected value for the action. Thus, the social networking system can make new suggestions to the user with new suggested actions.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   determining, for a user of a social networking system, a set of candidate actions available to the user in the social networking system;

for each candidate action of the set: assigning a social network value score indicative of a value to the social networking system of the user performing the candidate action, by:
  determining an engagement social network value score based at least in part on a measure of an engagement level of one or more users of the social networking system resulting from the performance of the candidate action by the user,
  determining a first discount score based on whether the candidate action has been suggested to the user,
  determining a second discount score based on how the candidate action is suggested to the user, different suggestion methods corresponding to different second discount scores, and
  determining the social network value score by combining the engagement social network value score, the first discount score, and the second discount score to determine the social network value score; and
suggesting one or more of the candidate actions to the user based at least in part on the social network value scores assigned to the candidate actions.

2. The method of claim 1, wherein the one or more suggested candidate actions are provided responsive to an action by the user.

3. The method of claim 2, wherein the action by the user is selected from a group consisting of submitting of a search query, sending a connection request, accepting a connection request, liking an item, commenting on an item, and posting an item on the social networking system.

4. The method of claim 1, wherein the one or more suggested candidate actions are provided to the user without the user requesting the suggestions.

5. The method of claim 1, further comprising:
predicting, for each candidate action, a likelihood that the user will perform the candidate action, the likelihood calculated responsive to historical data associated with the user within the social networking system; and
wherein the suggesting one or more of the candidate actions to the user is based at least in part on the predicted likelihood that the user will perform the one or more suggested candidate actions.

6. The method of claim 1, further comprising:
determining, for each candidate action, whether the candidate action is of an action type associated with a second user of a social networking system; and
in response to a determination that the candidate action is of an action type associated with a second user of a social networking system, determining a list of target users of the social networking system with whom the user can perform the candidate action.

7. The method of claim 6, wherein the action type associated with a second user of a social networking system is selected from the group consisting of messaging, poking, and tagging.

8. The method of claim 1, wherein the one or more suggested candidate actions comprise forming a new connection with a second user of the social networking system.

9. A method comprising:
determining, for a user of a social networking system, a set of candidate users who are not connected to the user in the social networking system;
for each candidate user of the set: assigning a social network value score indicative of a value to the social networking system of a new connection formed between the user and the candidate user, by:
  determining a duration of time since the candidate user joined the social networking system,
  determining an engagement social network value score based at least in part on a measure of an engagement level of the candidate user and the duration of time, the engagement social network value score inversely correlated to the duration of time,
  determining a first discount score based on whether the candidate user has been suggested to the user,
  determining a second discount score based on how the candidate user is suggested to the user, different suggestion methods corresponding to different second discount scores, and
  determining the social network value score by combining the engagement social network value score, the first discount score, and the second discount score; and
suggesting one or more of the candidate connections to the user based at least in part on the social network value scores assigned to the candidate connections.

10. The method of claim 9, wherein the set of candidate users is provided responsive to an action by the user.

11. The method of claim 10, wherein the action by the user is selected from the group consisting of submitting a search query, sending a connection request, accepting a connection request, liking an item, commenting on an item, and posting an item on the social networking system.

12. The method of claim 9, wherein the set of candidate users is provided to the user without the user requesting the suggestions.

13. The method of claim 9, further comprising:
predicting, for each candidate user of the set, a likelihood of forming the new connection between the user and the candidate user, the likelihood calculated responsive to historical data associated with the user within the social networking system; and
wherein the suggesting the set of candidate users to the user is further based on the predicted likelihood of the new connections between the user and the set of candidate users.

14. The method of claim 9, wherein the engagement level of the candidate user is correlated with a frequency of social networking system usage of the candidate user, and wherein the value to the social networking system of the new connection is higher if the frequency of social networking system usage of the candidate user is lower.

15. The method of claim 9, wherein the engagement level of the candidate user is correlated with a number of existing connections of the candidate user, and wherein the value to the social networking system of the new connection is higher if the number of existing connections of the candidate user is lower.

16. A system comprising:
a computer processor; and
a non-transitory computer-readable storage medium storing computer program code configured to cause the computer processor to:
  determine, for a user of a social networking system, a set of candidate actions available to the user in the social networking system;
  for each candidate action of the set: assign a social network value score indicative of a value to the social networking system resulting from performance of the candidate action by the user, by:
    determining an engagement social network value score based at least in part on a measure of an engagement level of one or more users of the social networking system resulting from the performance of the candidate action by the user,
determining a first discount score based on whether the candidate action has been suggested to the user,
determining a second discount score based on how the candidate action is suggested to the user, different suggestion methods corresponding to different second discount scores and
determining the social network value score by combining the engagement social network value score, the first discount score, and the second discount score to determine the social network value score;
suggest one or more of the candidate actions to the user based at least in part on the social network value scores assigned to the candidate actions.

17. A system comprising:
a computer processor; and
a non-transitory computer-readable storage medium storing computer program code configured to cause the computer processor to:
  determine, for a user of a social networking system, a set of candidate users who are not connected to the user in the social networking system;
  for each candidate user of the set: assign a social network value score indicative of a value to the social networking system of a new connection formed between the user and the candidate user, by:
    determining a duration of time since the candidate user joined the social networking system,
    determining an engagement social network value score based at least in part on a measure of an engagement level of the candidate user and the duration of time, the engagement social network value inversely correlated to the duration of time,
    determining a first discount score based on whether the candidate user has been suggested to the user,
    determining a second discount score based on how the candidate user is suggested to the user, different suggestion methods corresponding to different second discount scores, and
    determining the social network value score by combining the engagement social network value score, the first discount score, and the second discount score; and
  suggest one or more of the candidate connections to the user based at least in part on the social network value scores assigned to the candidate connections.

* * * * *